(12) United States Patent
Berckmans et al.

(10) Patent No.: US 7,738,566 B2
(45) Date of Patent: Jun. 15, 2010

(54) CIRCUIT ARRANGEMENT AND METHOD OF OPERATING SUCH CIRCUIT ARRANGEMENT

(75) Inventors: Nico Berckmans, Wijchen (NL); Ruurd Anne Visser, Beuningen (NL)

(73) Assignee: NXP B.V., Eindhoven (NL)

( * ) Notice: Subject to any disclaimer, the term of this patent is extended or adjusted under 35 U.S.C. 154(b) by 781 days.

(21) Appl. No.: 11/579,896

(22) PCT Filed: May 9, 2005

(86) PCT No.: PCT/IB2005/051499

§ 371 (c)(1),
(2), (4) Date: Nov. 10, 2006

(87) PCT Pub. No.: WO2005/109776

PCT Pub. Date: Nov. 17, 2005

(65) Prior Publication Data

US 2007/0217548 A1 Sep. 20, 2007

(30) Foreign Application Priority Data

May 11, 2004 (EP) .................. 04102025

(51) Int. Cl.
*H04B 3/00* (2006.01)
(52) U.S. Cl. .................. 375/257
(58) Field of Classification Search .................. 375/257, 375/295, 297; 455/114.3; 327/215, 224, 327/264, 272, 278, 285
See application file for complete search history.

(56) References Cited

U.S. PATENT DOCUMENTS

| 5,539,778 | A | | 7/1996 | Kienzler et al. |
| 5,572,658 | A | | 11/1996 | Mohr et al. |
| 5,765,031 | A | | 6/1998 | Mimuth et al. |
| 6,111,431 | A | * | 8/2000 | Estrada ........................ 326/83 |
| 2003/0017400 | A1 | | 1/2003 | Hamilton et al. |
| 2003/0086501 | A1 | | 5/2003 | Dreps et al. |
| 2004/0043739 | A1 | | 3/2004 | Jordanger et al. |
| 2004/0075467 | A1 | * | 4/2004 | Kiefer et al. .................. 326/82 |
| 2005/0151624 | A1 | * | 7/2005 | Qualich et al. ............. 340/5.72 |

FOREIGN PATENT DOCUMENTS

| DE | 3826774 | 2/1990 |
| WO | WO 92/17016 | 10/1992 |
| WO | WO 00/67432 | 11/2000 |

\* cited by examiner

*Primary Examiner*—Sam K Ahn

(57) ABSTRACT

In order to provide a circuit arrangement (100; 100'; 100") for use in a data transmission system comprising at least one input stage (IS) being connected downstream of at least one bus system (CB), in particular of at least one C[ontroller]A[rea]N[etwork] bus system, the input stage (IS) comprising at least one resistive ladder (RL) for dividing the input signals; and at least one amplifier stage (AS) connected downstream of the input stage (IS), as well as a corresponding method with improved common mode range and with better H[igh]F[requency] performance, it is proposed that that the voltage range of the amplifier stage (AS) is limited to a defined maximum voltage, in particular to the supply voltage (VCC).

12 Claims, 11 Drawing Sheets

CIRCUIT ARRANGEMENT AND METHOD OF OPERATING SUCH CIRCUIT ARRANGEMENT

The present invention relates in general to the field of data transmission, for instance in automotive applications.

The present invention in particular relates to a circuit arrangement for use in a data transmission system comprising
- at least one input stage being connected downstream of at least one bus system, in particular of at least one C[on-troller]A[rea]N[etwork] bus system, the input stage comprising at least one resistive ladder for dividing the input signals; and
- at least one amplifier stage connected downstream of the input stage.

The present invention further relates to a method of operating such circuit arrangement.

Figure 1:
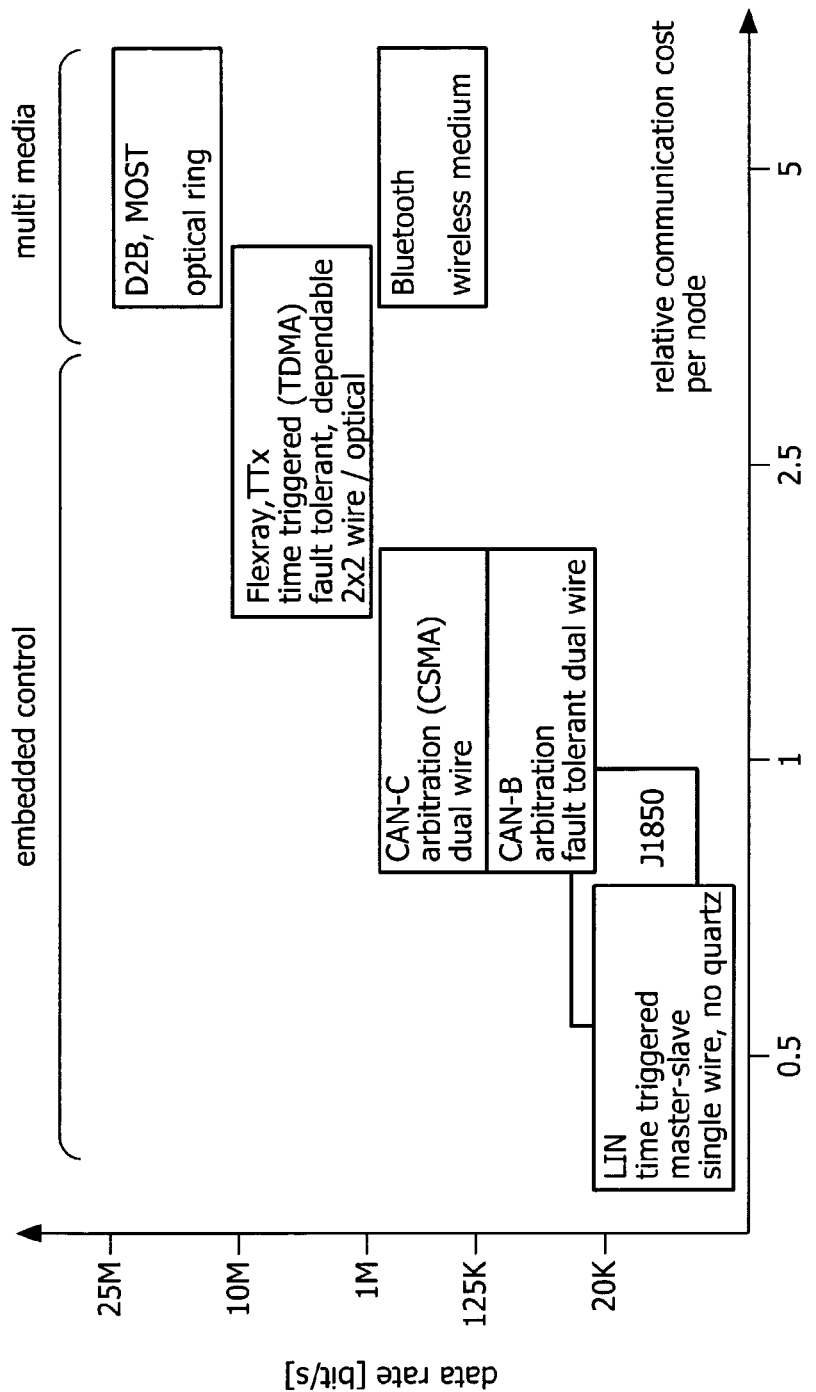

Communication between electronic modules, for example in cars, takes place via data busses. Depending on the data rate of the bus, several busses are commonly used (cf. FIG. 1 showing the data rate in bit per seconds versus the relative communication cost per node).

Each bus has its own dedicated bus transmitter/receiver or so-called transceiver. Important issues for such transceivers are the EME behaviour as well as the EMI behaviour where EME is the abbreviation of electro magnetic emission and EMI is the abbreviation of electro magnetic immunity.

Figure 2A:
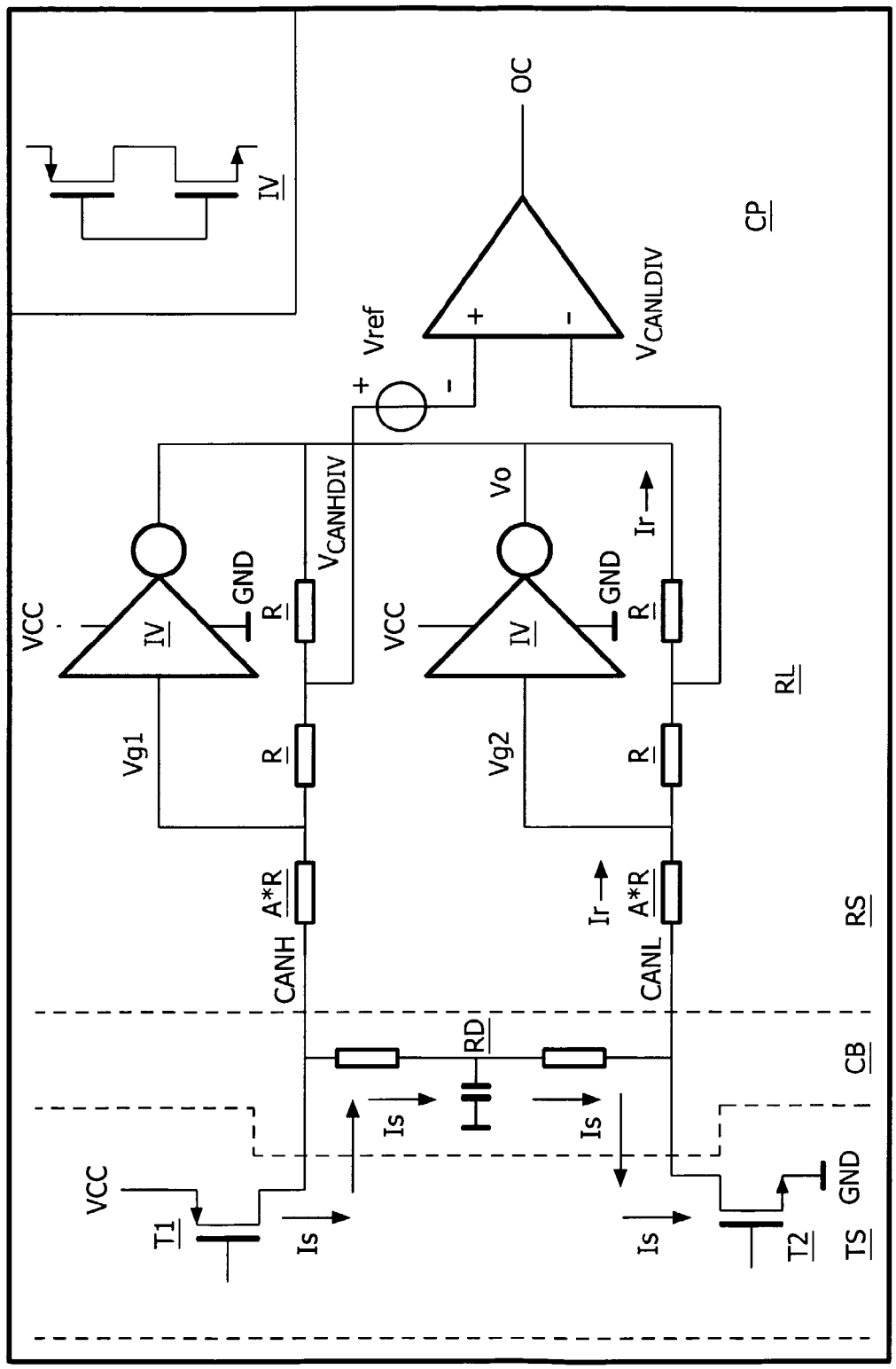

In FIG. 2A, a simplified schematic diagram of a prior art C[ontroller]A[rea]N[etwork] transmitter stage TS, bus CB and receiver stage RS of a CAN high speed transceiver is shown.

With respect to the transmitter stage TS of this electronic circuit only the two output transistors of the transmitter are shown in FIG. 2A. These two M[etal]O[xide]S[emiconductor] transistors are designed to create a perfect differential output signal on the terminals CANH[igh] and CANL[ow].

The current Is flows from the first output transistor through the resistive load RD on the bus CB into the second output transistor. Only very little current Ir is lost into the receiver RS.

When the transmitter TS is not transmitting, no input signal is applied to the CANH input and to the CANL input (so-called open circuit or recessive period). With no signal on CANH and CANL, the current Ir is zero. With Vg1=Vg2, the node voltages become Vg1=$V_0$=$V_{CANH}$, and Vg2=$V_0$=$V_{CANL}$.

Figure 2B:
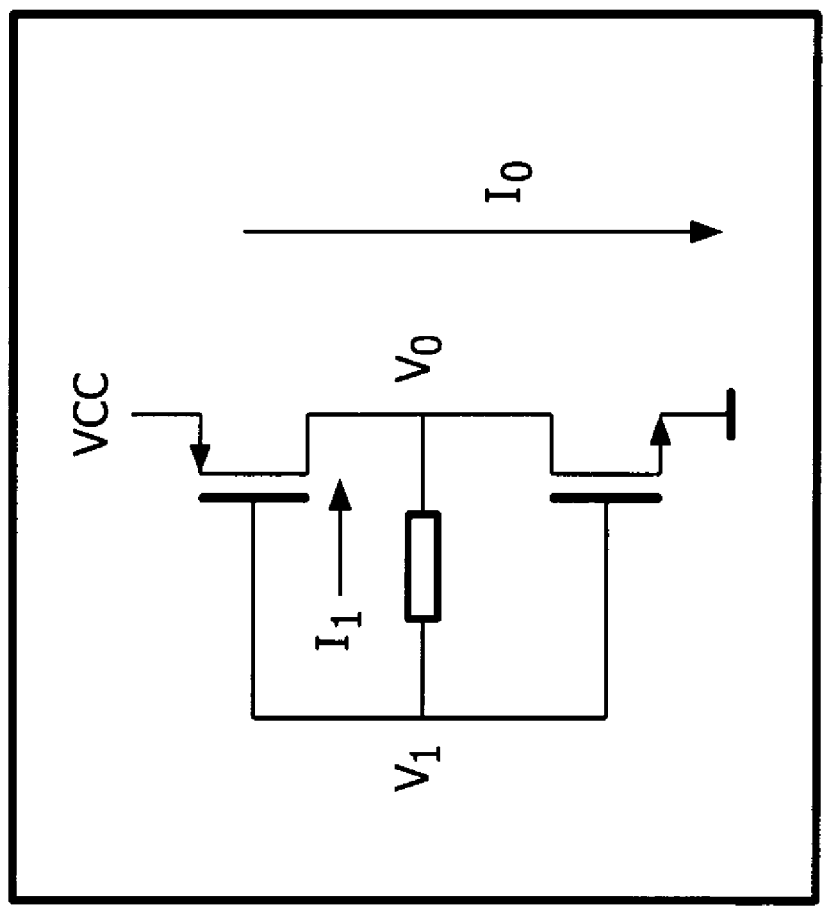

FIG. 2B shows the inverter IV in the situation during the open circuit or recessive period, i.e. when the transmitter TS is not transmitting:

Since current $I_1$ is zero, the voltage $V_0$ equals $V_1$. With simple most models $V_0$ can be determined to $V_0$=$VG_N$ where $Id_P$=$K_P/2 \cdot [(VCC-VG_N)-VT_P]$=$Id_N$=$K_N/2 \cdot (VG_N-VT_N)$. With $K_N/2$=$K_P/2$ and $VT_P$=$VT_N$, the voltage $V_0$ can be calculated:

$Id_P$=$K_N/2 \cdot [(VCC-V_0)-VT_N]$=$Id_N$=$K_N/2 \cdot (V_0-VT_N)$ and consequently $V_0$=$VCC/2$. The mid-level of the inverters IV depends on the threshold voltages and of the K factor of the Nmost device as well as of the Pmost device in the inverter IV.

When the transmitter TS is transmitting, a differential input signal is applied to the CANH input and to the and CANL input (so-called closed circuit or dominant period). Nodes Vg1 and Vg2 act as a virtual zeros, i.e. Vg1=Vg2. The voltages $V_{CANHDIV}$ and $V_{CANLDIV}$ then become $V_{CANHDIV}$=$(V_{CANH}-Vg1) \cdot R/(A*R)$ and $V_{CANLDIV}$=$(V_{CANL}-Vg2) \cdot R/(A*R)$.

For the comparator CP being connected downstream of the resistive ladder RL, the input signal is the differential voltage Vdiff=$V_{CANHDIV}$–$V_{CANLDIV}$. With a division factor A=23 and with Vg1=Vg2, the differential voltage becomes Vdiff=$V_{CANHDIV}$–$V_{CANLDIV}$=$(V_{CANH}-Vg1) \cdot R/(A*R)$–$(V_{CANL}-Vg2) \cdot R/(A*R)$=$(V_{CANH}-V_{CANL})/23$.

The input signals are divided by a factor of 23 and then used as input signals for the comparator CP. An accurate reference voltage Vref determines the trip level of the comparator output OC.

The relatively simple circuit of FIG. 2A enables required H[igh]F[requency] performance as well as an accurate division of the input signals. Further advantages of the circuit according to FIG. 2A are its well-defined input impedance and the good common mode rejection (immunity).

However, it has to be taken into consideration that for H[igh]F[requency] performance the bias current $I_0$ of the inverters IV has to be high in high speed applications such as H[igh]S[peed]C[ontroller]A[rea]N[etwork]. In addition, the spread of the threshold voltages and of the K factor of the Nmost device as well as of the Pmost device used in the inverter IV causes significant spread of the mid-level VCC/2.

Figure 2C:
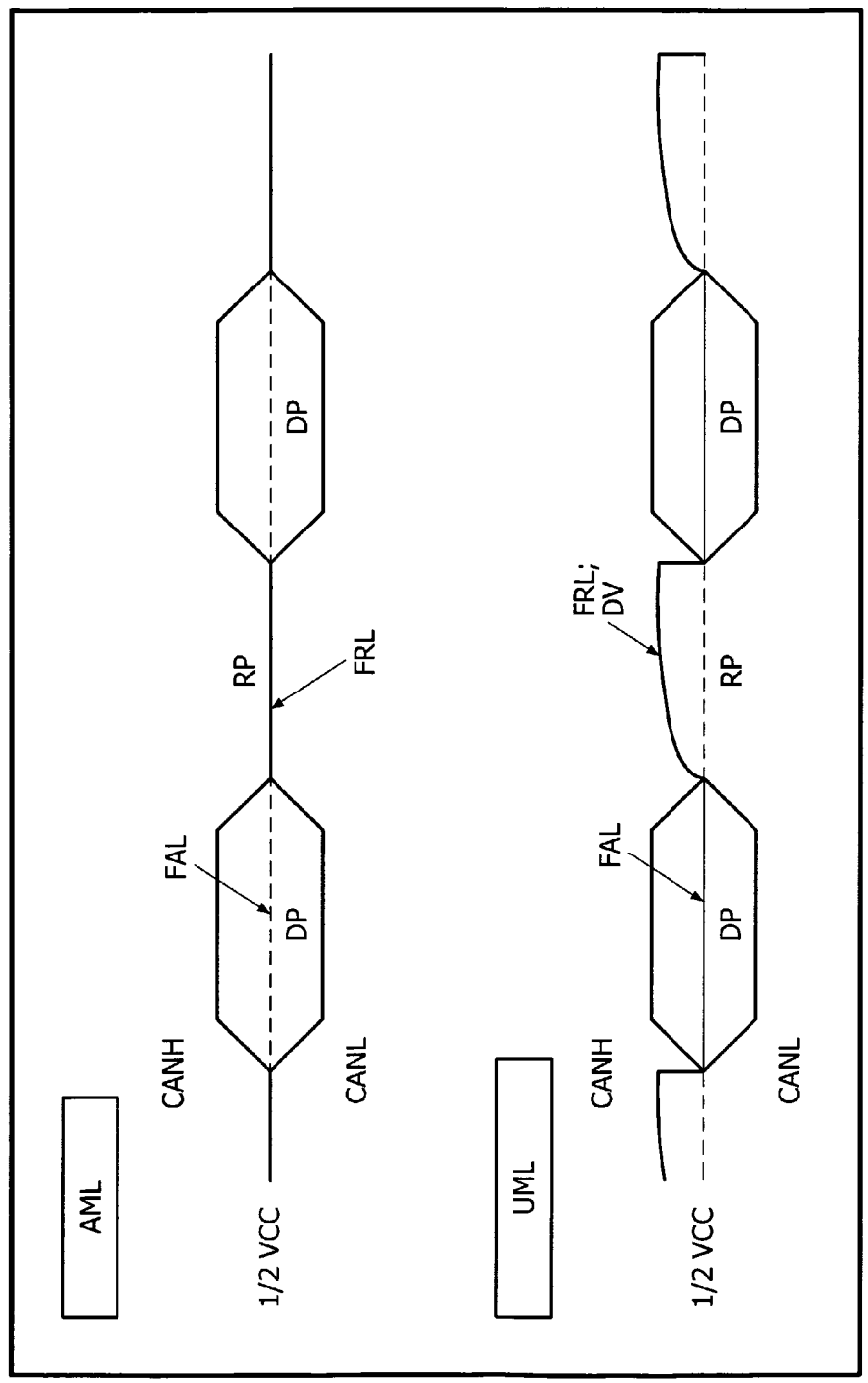

These spreads cause E[lectro]M[agnetic]E[mission] on the bus wires. FIG. 2C illustrates the effect of an accurate mid-level AML of the inverters IV and of an un-accurate mid-level UML of the inverters IV during transmission and the cause of EME:

During the dominant period DP (=transmitter TS is dominant over receiver RS), the transmitter TS forces the average level (=reference numeral FAL) to the mid-level VCC/2 in both cases, i.e. in the case of an accurate mid-level AML of the inverters IV as well as in the case of an un-accurate mid-level UML of the inverters IV.

During the recessive period RP, the receiver input circuit forces the recessive level (=reference numeral FRL) to the mid-level VCC/2 of the inverters IV in both cases, i.e. in the case of an accurate mid-level AML of the inverters IV as well as in the case of an un-accurate mid-level UML of the inverters IV. However, in the latter case (=un-accurate mid-level UML of the inverters IV), the mid-level of the inverters IV deviates (=reference numeral DV) from the typical VCC/2 (in the case of FIG. 2C, a positive deviation from the typical mid-level VCC/2 is shown).

To summarize, in the case of an accurate mid-level AML of the inverters IV the signal on the bus is differential with no EME. In the case where the mid-level of the inverters IV deviates from the average level forced by the transmitter TS also a non-differential signal appears on both CANH and CANL, which causes EME.

With respect to corresponding state of the art, prior art document EP 0 576 442 A1, prior art document WO 00/67432 A1, prior art document US 2003/0174000 A1 as well as prior art document US 2004/0043739 A1 are not meant to force the CAN bus wires CANH and CANL on mid-level VCC/2 so as to enable an as much as possible symmetrical differential signal on the CAN bus for low EME by the transmitter; merely prior art document US 2003/0086501 A1 refers to the mid-level VCC/2 on the transmission line in order to reduce sensitivity for common mode ripple.

Figure 3A:
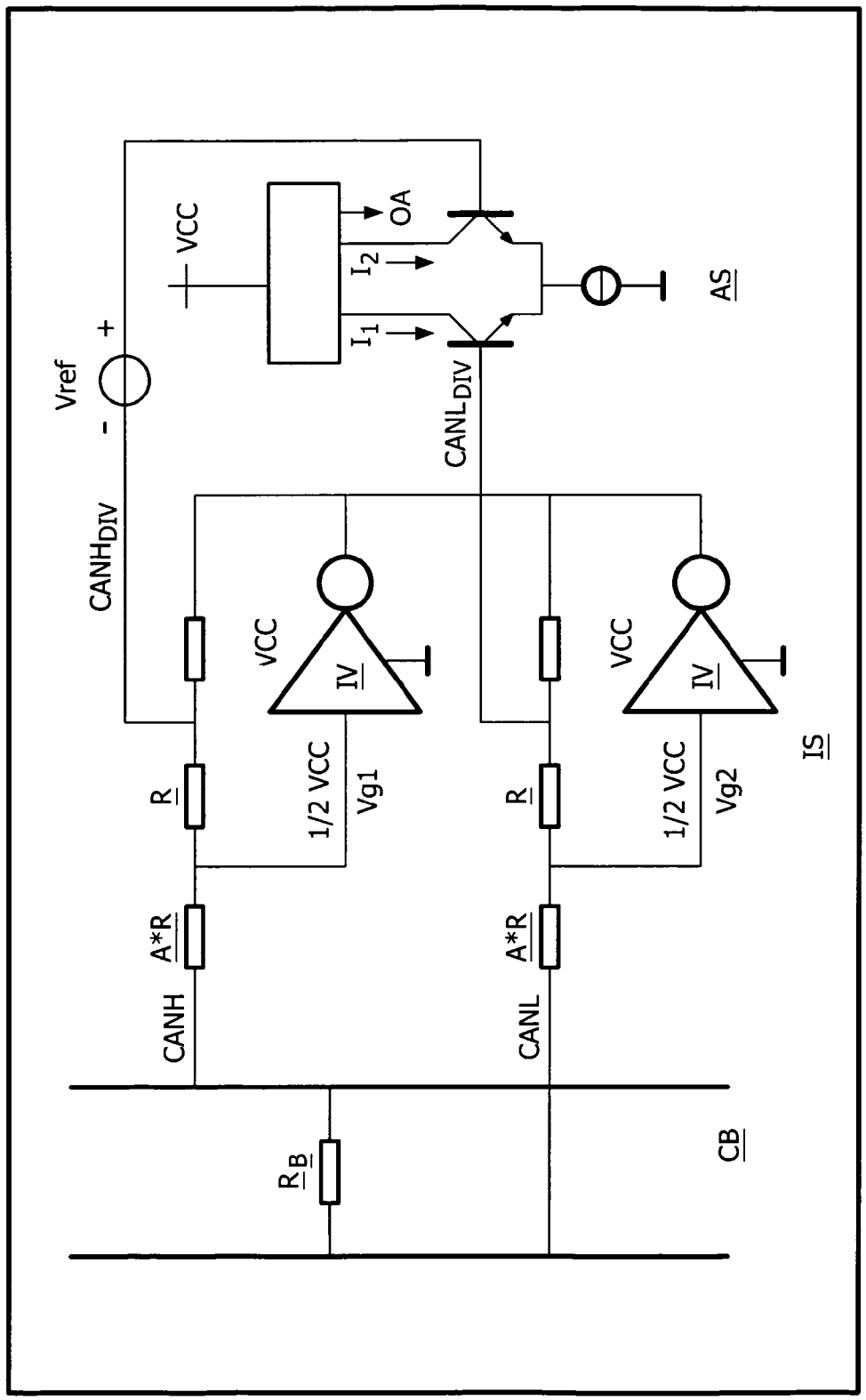

In FIG. 3A, a simplified schematic diagram of a prior art receiver stage of a C[ontroller]A[rea]N[etwork] high speed transceiver is shown. This receiver circuit comprises input stages 1S as well as an amplifier stage AS wherein the input stages 1S are made with inverters IV and resistors R constituting a resistor ladder network RL. The inverters IV are designed such that the potentials Vg1 and Vg act as virtual zeros at a level of VCC/2.

CANH[igh] and CANL[ow] are provided by the CAN bus CB and are divided by the resistor ladder network RL and become $CANH_{DIV}=CANH/A$ and $CANL_{DIV}=CANL/A$, where A is the division factor of the resistor ladder network RL (cf. FIG. 3A). By dividing the input signal the immunity for common mode disturbance increases.

To keep the amplifier within its operational range the signals $CANH_{DIV}$ and $CANL_{DIV}$ have to stay between +1V[olt] and VCC−1V, where VCC is the supply voltage. With a minimal supply voltage VCC of 4.5 Volt and some additional spread on the Vg1 level and on the Vg2 level of VCC/2 the maximum common mode voltage swing of $CANH_{DIV}$ and $CANL_{DIV}$ is limited to approximately one Volt.

Figure 3B:
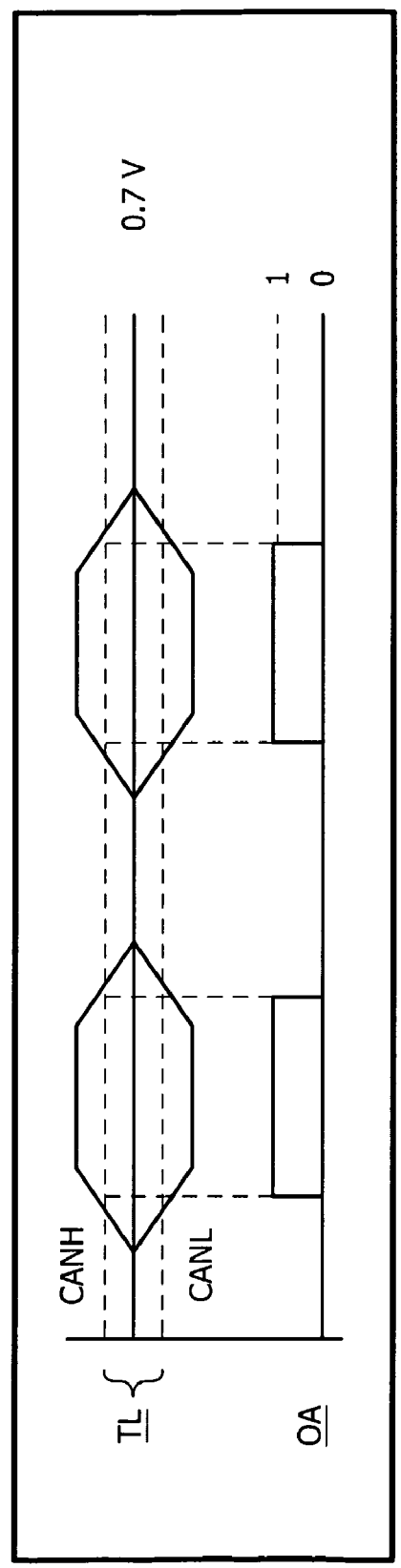

It is illustrated in FIG. 3B that the reference potential Vref (cf. also FIG. 3A) is the internal threshold level TL at which the output OA of the amplifier AS switches from 0 to 1 and vice versa.

The relatively simple receiver circuit of FIG. 3A enables required H[igh]F[requency] performance as well as an accurate division of the input signals. Further advantages of the receiver circuit according to FIG. 3A are its well-defined input impedance and the good common mode rejection (immunity).

However, it has to be taken into consideration that in order to be able to handle very high common mode input signals (up to ±40 Volt) the division of the input signal must be forty times (±1 Volt voltage swing internal). For a typical threshold level TL of 0.7 Volt (cf. FIG. 3B) the internal reference potential Vref should be 0.7 Volt/40=17.5 Millivolt. The internal reference potential Vref becomes so small that it is very difficult to keep all tolerances and offsets low enough for an accurate threshold level TL and to keep the speed of the receiver according to FIG. 3A high.

The amplifiers according to prior art document EP 0 576 442 A1 as well as according to prior art document WO 00/67432 A1 have in common that the tail current is always connected to the supply voltage VCC or to ground potential GND; this limits the use of the amplifiers to roughly two diodes above supply and/or ground.

Starting from the disadvantages and shortcomings as described above and taking the prior art as discussed into account, an object of the present invention is to provide a circuit arrangement for use in a data transmission system as well as a corresponding method with improved common mode range and with better H[igh]F[requency] performance.

The object of the present invention is achieved by a circuit arrangement comprising the features of claim 1 as well as by a method comprising the features of claim 8. Advantageous embodiments and expedient improvements of the present invention are disclosed in the respective dependent claims.

The gist of the present invention refers to a differential amplifier having in combination with at least one resistive ladder network an increased and therefore large common mode input range significantly improving the immunity for R[adio]F[requency] injected disturbance (E[lectro]M[agnetic]I[mmunity]) on the CAN bus. To this aim, a (compared to the above-discussed prior art) different type of amplifier is used insofar as the amplifier only has a limitation in voltage range to a defined maximum voltage, in particular toward the supply voltage VCC.

A preferred embodiment of the amplifier stage can be based on at least one current mirror load, i.e. at least one current mirror can be used as the active load so as to accomplish high gain for a single stage differential amplifier. In this context, two npn transistors can make up the differential amplifier, and two pnp transistors can make up the current mirror.

According to a preferred embodiment of the present invention, the differential amplifier is used together with a (compared to the above-discussed prior art) different resistor ladder network for dividing the input signals; this ladder network or resistor network (-->division of input signals) is terminated to ground.

Such preferred embodiment of an accurate resistive ladder creates an accurate recessive voltage on the CAN bus thus reducing the E[lectro]M[agnetic]E[mission] caused by an inaccurate recessive voltage on the CAN bus, i.e. at the input stage of the bus receiver. Consequently, it is possible to determine the recessive level of CANH[igh] and of CANL[ow] by choosing the appropriate resistor value.

CANH[igh] and CANL[ow] as provided by the CAN bus are divided by the division factor A of the resistor ladder network, thus becoming $CANH[igh]_{DIV}=CANH[igh]/A$ and $CANL[ow]_{DIV}=CANL[ow]/A$. In an advantageous embodiment of the present invention, at least one capacitor assigned to $CANH[igh]_{DIV}=CANH[igh]/A$ as well as at least one capacitor assigned to the $CANL[ow]_{DIV}=CANL[ow]/A$ can be used for filtering. The respective capacitor can be provided between the C[ontroller]A[rea]N[etwork] bus system and the receiver stage of the circuit.

According to an essential feature of the present invention, negative voltages can be freely applied to the amplifier because there is no direct connection of the amplifier with the ground pin. CAN bus, resistive ladder network and amplifier are used for improving the common mode range as well as the H[igh]F[requency] performance and to make internal reference voltage.

In other words, the simple circuit according to the present invention enables a very high common mode rejection (immunity) and a H[igh]F[requency] performance; the circuit allows a larger voltage swing resulting in a lower division factor A (preferably much smaller than 40) and a larger threshold (internal reference) voltage (by the present invention, it is easy to make an internal reference voltage).

Apart from that, the present invention provides a much more accurate mid-level of the receiver resulting in less E[lectro]M[agnetic]E[mission] and uses significantly less current in high speed applications. Thus, one of the most striking advantages of the present invention can be seen in the provision of a very accurate recessive voltage level with very low spread resulting in low EME during transmission as well as a low current consumption.

Furthermore, the good HF performance as well as the well-defined input impedance will be appreciated. Finally, the present invention enables an accurate division of the input signal and a good common mode ripple rejection.

The present invention further relates to a system base chip, comprising at least one circuit arrangement as described above.

The present invention finally relates to the use of at least one circuit arrangement as described above and/or of at least one system base chip as described above and/or of the method as described above for automotive applications, especially for automotive CAN busses, more particularity for CAN bus-receivers and/or CAN bus transceivers. Accordingly, the present invention can be used in CAN bus drivers in I[n-]V[ehicle]N[etworks] where E[lectro]M[agnetic]I[mmunity] is of importance and where the recessive voltage level is between ground potential and supply voltage.

Figure 4A:
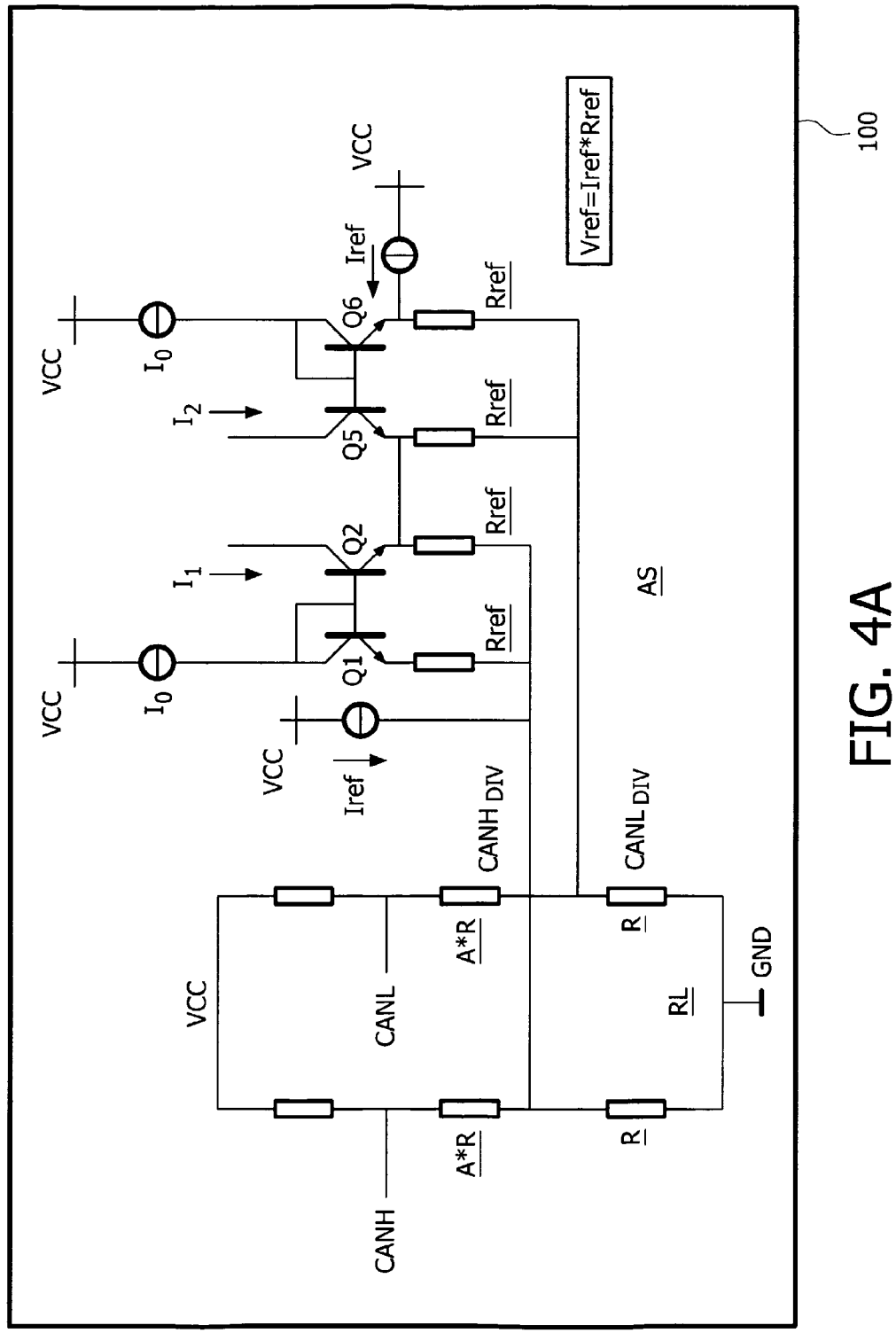
Figure 4B:
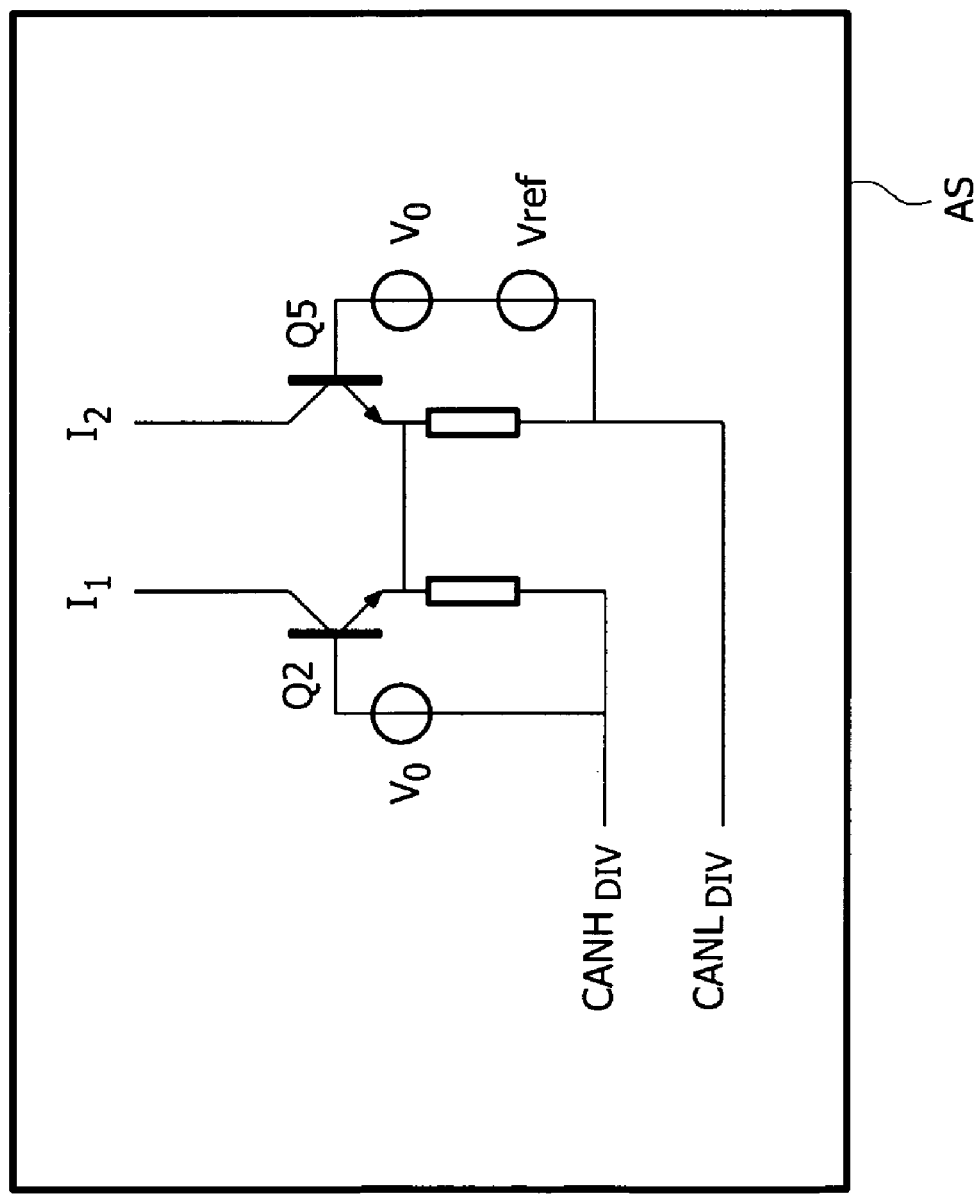
Figure 5:
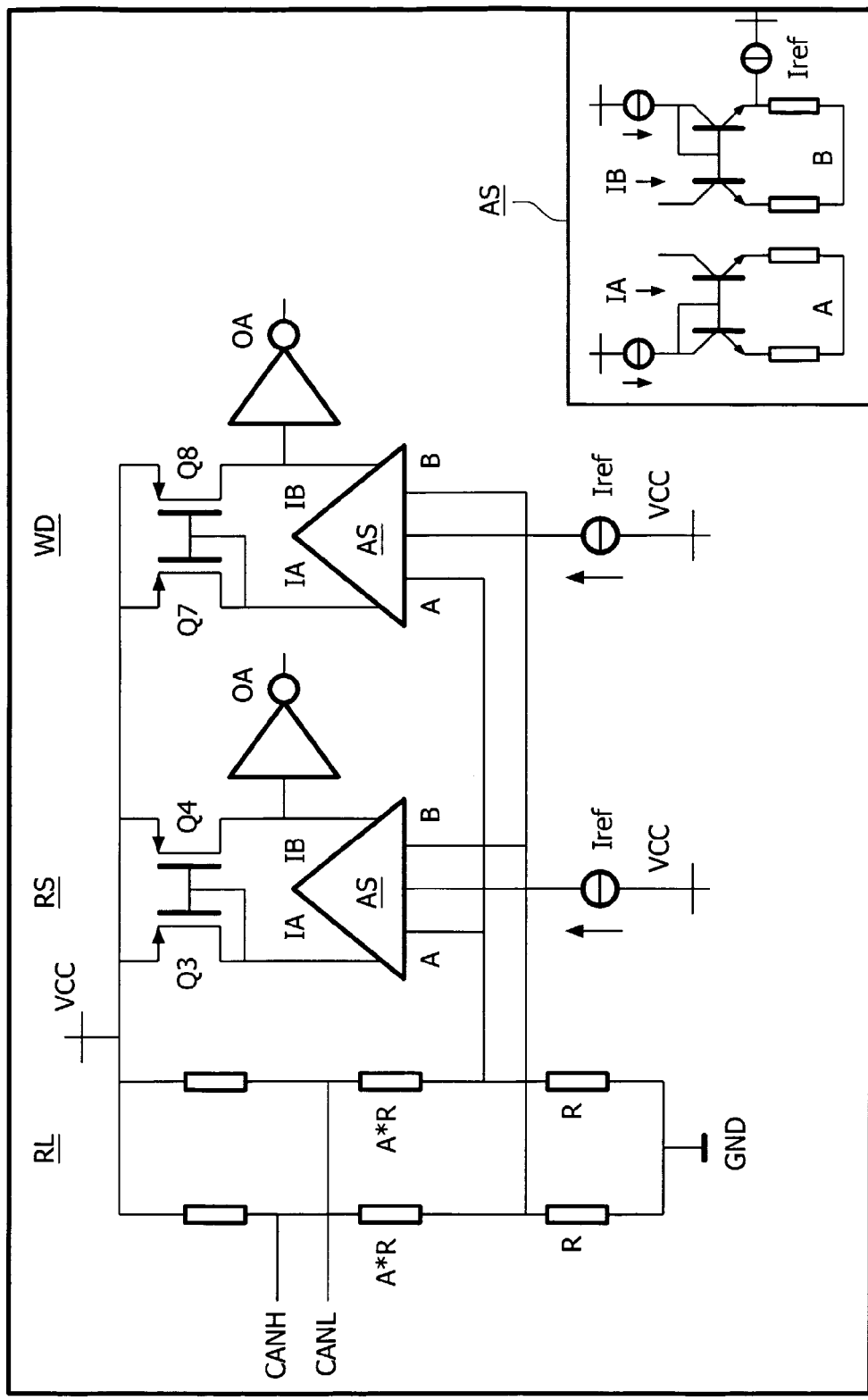
Figure 6:
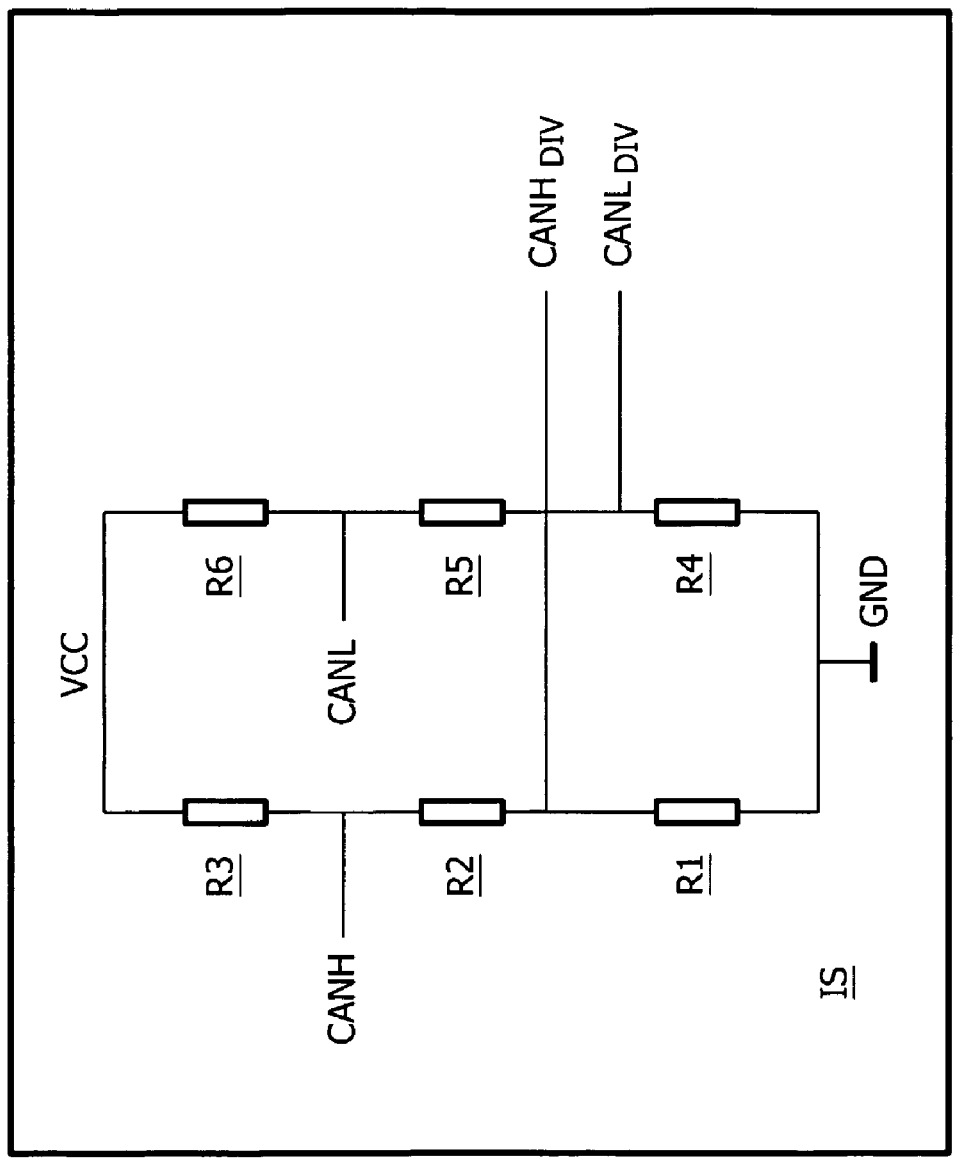
Figure 7:
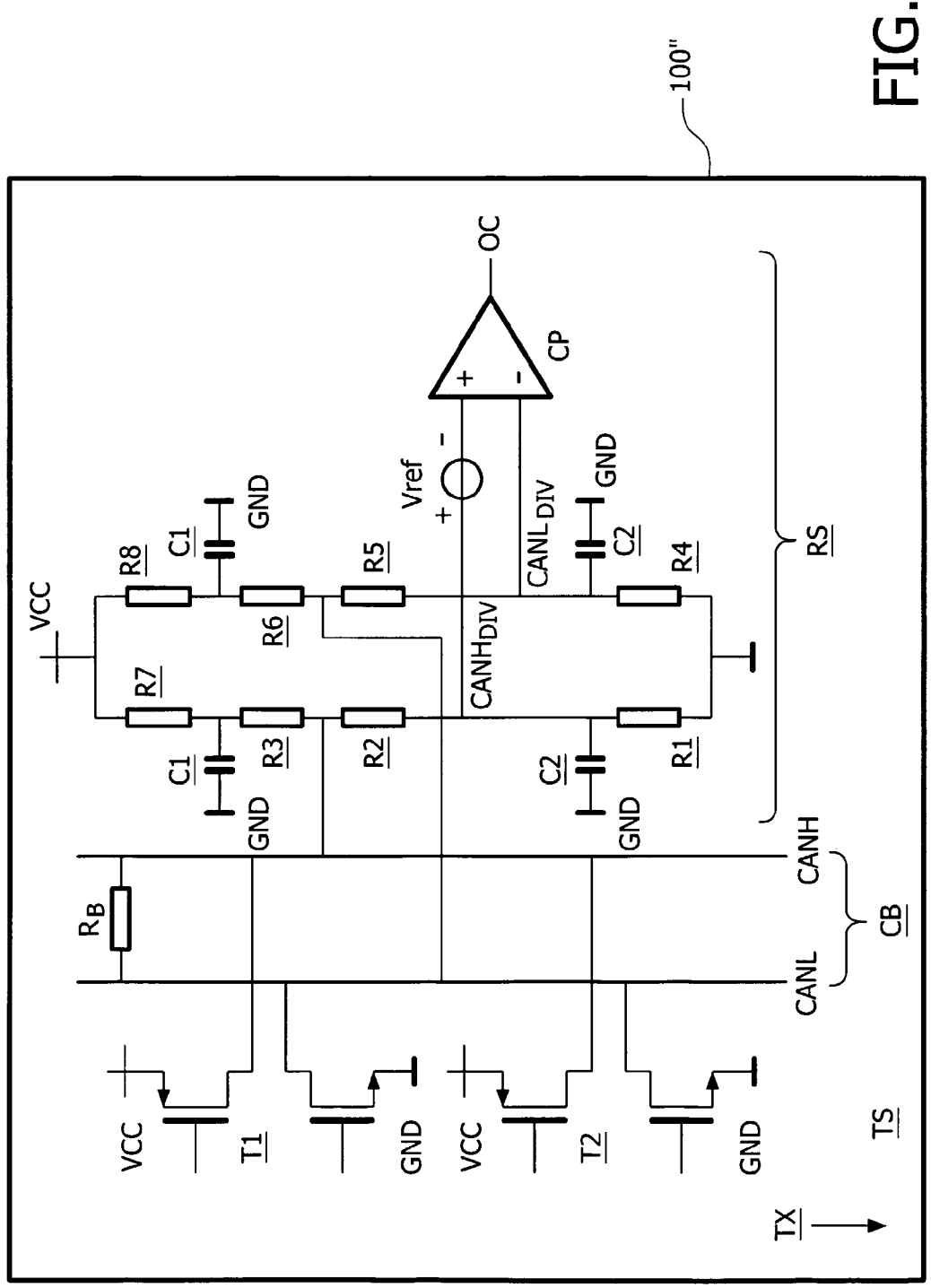

As already discussed above, there are several options to embody as well as to improve the teaching of the present invention in an advantageous manner. To this aim, reference is made to the claims respectively dependent on claim 1 and on claim 8; further improvements, features and advantages of the present invention are explained below in more detail with reference to preferred embodiments by way of example and to the accompanying drawings (cf. FIG. 4A to FIG. 7) where FIG. 1 schematically shows a diagram for data busses in cars where the relative communication cost per node is illustrated as a function of the data rate in bit per seconds;

FIG. 2A schematically shows a (simplified) prior art C[on-troller]A[rea]N[etwork] transmitter stage, bus and receiver stage of a CAN high speed transceiver;

FIG. 2B schematically shows a prior art inverter of the CAN high speed transceiver of FIG. 2A during open circuit or recessive period;

FIG. 2C schematically compares the effects of an accurate mid-level of the prior art inverter of FIG. 2B with an unaccurate mid-level of the prior art inverter of FIG. 2B during transmission;

FIG. 3A shows a (simplified) prior art receiver stage of a C[ontroller]A[rea]N[etwork] high speed transceiver;

FIG. 3B schematically illustrates the fact that the reference potential Vref is the internal threshold level at which the output of the amplifier of the CAN high speed transceiver of FIG. 3A switches from 0 to 1 and vice versa;

FIG. 4A schematically shows a first embodiment of a circuit arrangement according to the present invention which works according to the method of the present invention;

FIG. 4B schematically shows an embodiment of a (differential) amplifier stage of a circuit arrangement according to the present invention;

FIG. 5 schematically shows a second embodiment of a circuit arrangement according to the present invention which works according to the method of the present invention;

FIG. 6 schematically shows an embodiment of an input circuit of the receiver stage of a circuit arrangement according to the present invention; and FIG. 7 schematically shows a third embodiment of a circuit arrangement according to the present invention which works according to the method of the present invention.

The same reference numerals are used for corresponding parts in FIG. 1 to FIG. 7.

The schematic of a first embodiment of an electronic circuit arrangement 100 is shown in FIG. 4A.

The resistor ladder RL is designed to keep the bus wires CANH[igh] and CANL[ow] at VCC/2, i.e. typically at 2.5 Volt. The CANH signal as well as the CANL signal are divided to $CANH_{DIV}$ and $CANL_{DIV}$ by a division factor A constituted by a respective serial alignment of a resistor arrangement A*R between the CANH/L terminal and the $CANH/L_{DIV}$ terminal and a resistor R between the $CANH/L_{DIV}$ terminal and the ground potential GND.

The D[irect]C[urrent] level of $CANH_{DIV}$ and $CANL_{DIV}$ is therefore close to zero.

If for example a division factor A=12, a supply voltage VCC=4.5 Volt and $V_{CANH}=V_{CANL}$=VCC/2=2.25 Volt are assumed, then the DC level of $V_{CANHDIV}=V_{CANLDIV}$=2.25 Volt/12=0.1875 Volt.

Downstream of the resistor ladder network RL (input stage IS), the amplifier stage AS is connected to the $CANH_{DIV}$ bus and to the $CANL_{DIV}$ bus. The amplifier stage AS comprises a pair of npn transistors Q1, Q2 assigned to the $CANH_{DIV}$ bus and a pair of npn transistors Q5, Q6 assigned to the $CANL_{DIV}$ bus.

The respective emitter terminal of the two transistors Q1, Q2 is connected to the $CANH_{DIV}$ bus via a respective reference resistor Rref; correspondingly, the respective emitter terminal of the two transistors Q5, Q6 is connected to the $CANL_{DIV}$ bus via a respective reference resistor Rref.

As can be further taken from FIG. 4A, the collector terminal of the first transistor Q1 is provided with bias current $I_0$, whereas the collector terminal of the second transistor Q2 is provided with output current $I_1$; correspondingly, the collector terminal of the first transistor Q5 is provided with output current $I_2$, whereas the collector terminal of the second transistor Q6 is provided with bias current $I_0$.

As can be further taken from FIG. 4A, the collector terminal of the first transistor Q1 is connected with the base terminal of the first transistor Q1, and the base terminal of the first transistor Q1 is connected with the base terminal of the second transistor Q2;

correspondingly, the collector terminal of the second transistor Q6 is connected with the base terminal of the second transistor Q6, and the base terminal of the first transistor Q5 is connected with the base terminal of the second transistor Q6.

Accordingly, the amplifier stage AS has no negative voltage limitation for the inputs $CANH_{DIV}$ and $CANL_{DIV}$, the only limitation is a positive voltage towards the supply VCC. As can be taken from FIG. 4A, the amplifier AS does not have any tail current connected to ground GND but the amplifier AS is connected to the input signals.

As a consequence, a common mode signal on the inputs can go below VCC or ground, and the amplifier AS still works fine. Without process limitations it can go to very high voltages below ground GND and it would still work fine; this increases the range where the amplifier AS can be used.

With VCC=4.5 Volt and a maximum amplifier input voltage of VCC−1V, the maximum positive voltage swing that is allowed becomes Vpmax=VCC−1 Volt−0.1875 Volt=3.3125 Volt. With a voltage swing of 3.3125 Volt maximum and an input common mode range of ±40 Volt, the division becomes A=40/3.3125=12 (as assumed above).

This also means that the differential input signal is divided by a factor of 12 resulting in a reference voltage Vref=Iref*Rref of 0.7 Volt/12=58 Millivolt. An accurate internal reference voltage of 58 Millivolt is easy to make with all the tolerances in the design of the circuit arrangement 100 of FIG. 4A.

FIG. 4B shows a (simplified) embodiment of the differential amplifier AS (=npn transistor Q2+ npn transistor Q5) as comprised by the circuit arrangement 100 of FIG. 4A. The first npn transistor Q1 of the $CANH_{DIV}$ part of the amplifier stage AS plus bias current $I_0$ times reference resistance Rref is replaced by voltage $V_0$; the second npn transistor Q6 of the $CANL_{DIV}$ part of the amplifier stage AS plus bias current $I_0$ times reference resistance Rref is also replaced by voltage $V_0$; reference current Iref times reference resistance Rref is replaced by reference voltage Vref.

FIG. 5 shows a possible application of the circuit arrangement 100 of FIG. 4A in a H[igh]S[peed] CAN transceiver 100', for example in a S[ystem]B[ase]C[hip] in-vehicle networking (IVN) products.

Such system base chips combine transceiver functionality, voltage regulators and a watchdog, with diagnostics and a fully embedded fail-safe system. The one-chip integration of generic electronic control unit (ECU) functions with the powerful fail-safe system makes it very easy for design engineers to build automotive network nodes that offer excellent protection against network lock-ups and dead batteries.

The system base chip covers all combined C[ontroller]A[rea]N[etwork] and L[ocal]I[nterconnect]N[etwork] applications, ranging from local electric window nodes to central engine management and dashboard applications. In this context, the system base chip offers the choice between one or two physical layers, always in combination with the same system core, generic functions and fail-safe system, and always in the same small package. This makes it easy and cost-effective for designers to substitute physical layers in electronic control units (ECUs), with maximum re-use of ECU hardware and software.

So as to accomplish this aim, the H[igh]S[peed] CAN transceiver 100' is based on two current mirror loads for the differential amplifiers AS or for the wake-up detector WE. In this context, the two npn transistors Q1, Q2
(for the CANH$_{DIV}$ branch, assigned to the amplifier AS; cf. FIG. 4A) or
the two npn transistors Q5, Q6
(for the CANL$_{DIV}$ branch, assigned to the wake-up detector WE; cf. FIG. 4A)
make up the respective differential amplifier AS or the wake-up detector WD, and
the two pnp transistors Q3, Q4 (for the CANH$_{DIV}$ branch)
or
the two pnp transistors Q7, Q8 (for the CANL$_{DIV}$ branch)
make up the respective current mirror.

FIG. 6 shows an embodiment of the circuit of the input stage 1S of the databus receiver RS. The input signals CANH and CANL are divided by an accurate resistor ladder network RL, which improves the common mode rejection.

In more detail, the resistor ladder RL comprises six resistors R1, R2, R3, R4, R5, R6 determining the recessive level of the CANH bus and of the CANL bus. By choosing the appropriate resistor values of the resistors R1, R2, R3, R4, R5, R6, any recessive voltage on the CANH bus and on the CANL bus can be created.

With
the CANH$_{DIV}$ bus being connected between the first resistor R1 and the second resistor R2,
the CANH bus being connected between the second resistor R2 and the third resistor R3,
the CANL$_{DIV}$ bus being connected between the fourth resistor R4 and the fifth resistor R5,
the CANL bus being connected between the fifth resistor R5 and the sixth resistor R6,
the first resistor R1 and the fourth resistor R4 being connected on ground potential GND, and
the third resistor R3 and the sixth resistor R6 being connected on supply voltage VCC,
the voltage V$_{CANH}$ on CANH becomes V$_{CANH}$=VCC·[R3/(R3+R2+R1)] and
the voltage V$_{CANL}$ on CANL becomes V$_{CANL}$=VCC·[R6/(R6+R5+R4)].

In case of a recessive voltage of VCC/2, the third resistor R3 equals the sixth resistor R6, i.e. R3=R6=R2+R1=R4+R5.

FIG. 7 shows the CAN transmitter stage TS, the H[igh]S[peed] CAN bus CB and the databus receiver stage RS of a third embodiment of a CAN high speed transceiver 100".

With respect to the transmitter stage TS of this electronic circuit 100", it can be seen from FIG. 7 that the CAN bus CB can be connected to one or more transmitters T1, T2, ..., TX, with each transmitter T1, T2, ..., TX comprising
a pnp transistor,
the emitter terminal of which is connected to the supply voltage VCC and
the collector terminal of which is connected to the CANH bus, as well as
a npp transistor,
the collector terminal of which is connected to the CANL bus and
the emitter terminal of which is connected to the ground potential GND.

These transmitters T1, T2, ..., TX are designed to create a perfect differential output signal on the terminals CANH[igh] and CANL[ow] which are separated by a R$_B$=60 Ohm.

The resistor ladder network RL that divides the CANH input signal and the CANL input signal has additional filtering on capacitive basis:

The two first capacitors C1 are connected
between the third resistor R3, a seventh resistor R7 and ground potential GND
as for the high branch CANH of the bus system CB and
between the sixth resistor R6, an eighth resistor R8 and ground potential GND
as for the low branch CANL of the bus system CB
and are used to filter out H[igh]F[requency] signals on the CAN bus CB before it ends up into the supply VCC.

The two second capacitors C2 are connected
between the first resistor R1, the second resistor R2 and ground potential GND
as for the high branch CANH of the bus system CB and
between the fourth resistor R4, the fifth resistor R5 and ground potential GND
as for the low branch CANL of the bus system CB
and are used to filter H[igh]F[requency] signals from the CAN bus CB before it ends up into the comparator CP being provided with CANH$_{DIV}$ and CANL$_{DIV}$.

Possible applications of the third embodiment are a H[igh]S[peed] CAN transceiver 100" in a System Base Chip (SBC) as described above with respect to the first embodiment 100 and the first embodiment 100'.

The H[igh]S[peed] CAN transceivers 100 (cf. FIG. 4A), 100' (cf. FIG. 5) and 100" (cf FIG. 7) are designed for advanced use in automotive and general industrial applications. These transceivers support the differential bus signal representation being described in the international standard for in-vehicle CAN High-Speed applications (ISO11898).

In this context, C[ontroller]A[rea]N[etwork] is the standard protocol for serial in-vehicle bus communication, particularly for engine management and body multiplexing. The transceivers according to the present invention provide a standby mode with significantly reduced power consumption.

Besides the excellent low-power behaviour, the transceivers 100, 100' and 100" offer several valuable system improvements; highlights are the absolute passive bus behaviour in case the device is unpowered as well as the excellent E[lectro]M[agnetic] C[ompatibility] performance.

The present invention provides essentially improved reception properties and can be used in all CAN bus drivers in I[n-]V[ehicle]N[etworks] where E[lectro]M[agnetic]E[mission] is of importance and where the recessive voltage level is between the supply voltage VCC and the ground potential GND.

LIST OF REFERENCE NUMERALS

100 circuit arrangement (first embodiment; cf. FIG. 4A)
100' circuit arrangement (second embodiment; cf. FIG. 5)
100" circuit arrangement (third embodiment; cf. FIG. 7)
A division factor
AML accurate mid-level of the inverter IV AS amplifier or amplifier stage, in particular differential amplifier or differential amplifier stage
CANH bus wire for the high part of the bus system CB
$CANH_{DIV}$ divided CANH
CANL bus wire for the low part of the bus system CB
$CANL_{DIV}$ divided CANL
CB bus system, in particular C[ontroller]A[rea]N[etwork] bus system
CP comparator
DP dominant period
DV deviation from the mid-level VCC/2
FAL forcing the average level to the mid-level VCC/2
FRL forcing the recessive level to the mid-level VCC/2
GND ground potential or ground terminal
$I_0$ bias current
$I_1$ output current
$I_2$ output current
Ir current from the bus system CB to the resistive ladder RL
Iref reference current
Is current from the first transistor to the second transistor
IS input or input stage
IV inverter
OA output signal of the amplifier stage AS
OC output signal of the comparator CP
Q1 first transistor, in particular first npn transistor, of the $CANH_{DIV}$ part of the amplifier stage AS
Q2 second transistor, in particular second npn transistor, of the $CANH_{DIV}$ part of the amplifier stage AS
Q3 third transistor, in particular first pnp transistor, of the $CANH_{DIV}$ part of the amplifier stage AS
Q4 fourth transistor, in particular second pnp transistor, of the $CANH_{DIV}$ part of the amplifier stage AS
Q5 first transistor, in particular first npn transistor, of the $CANL_{DIV}$ part of the amplifier stage AS
Q6 second transistor, in particular second npn transistor, of the $CANL_{DIV}$ part of the amplifier stage AS
Q7 third transistor, in particular first pnp transistor, of the $CANL_{DIV}$ part of the amplifier stage AS
Q8 fourth transistor, in particular second pnp transistor, of the $CANL_{DIV}$ part of the amplifier stage AS
R resistor
R1 first resistor
R2 second resistor
R3 third resistor
R4 fourth resistor
R5 fifth resistor
R6 sixth resistor
R7 seventh resistor
R8 eighth resistor
RD resistive load between the first transistor and the second transistor
RL resistive ladder
RP recessive period
Rref reference resistor
RS receiver or receiver stage
TL internal threshold level
TS transmitter or transmitter stage
T1 first transmitter, in particular first output transmitter, of the transmitter stage TS
T2 second transmitter, in particular second output transmitter, of the transmitter stage TS
TX further transmitter, in particular further output transmitter, of the transmitter stage TS
UML un-accurate mid-level UML of the inverter IV
$V_0$ voltage, in particular bias voltage
$V_1$ voltage, in particular output voltage
$V_{CANH}$ voltage on bus wire CANH
$V_{CANHDIV}$ voltage on divided bus wire $CANH_{DIV}$
$V_{CANL}$ voltage on bus wire CANL
$V_{CANLDIV}$ voltage on divided bus wire $CANL_{DIV}$
VCC supply voltage or supply terminal
VCC/2 mid-level of the supply voltage VCC
Vdiff differential voltage
Vg1 node voltage with respect to $CANH_{DIV}$
Vg2 node voltage with respect to $CANL_{DIV}$
Vref reference voltage
WD wake-up detector

The invention claimed is:

1. Circuit arrangement for use in a data transmission system, the circuit arrangement comprising:
at least one input stage being connected downstream of at least one bus system, in particular of at least one C[ontroller]A[rea]N[etwork] bus system, the input stage comprising at least one resistive ladder for dividing the input signals, wherein the resistive ladder comprises two parallel resistor branches; and
at least one amplifier stage connected downstream of the input stage, characterized in that the voltage range of the amplifier stage is limited to a defined maximum voltage, in particular to the supply voltage, wherein the input stage further comprises a divided bus system connected downstream of the resistive ladder, characterized in that the resistive ladder comprises at least six resistors determining the recessive level of the high branch of the bus system as well as the low branch of the bus system, in particular with
the high branch of the divided bus system being connected between the first resistor and the second resistor,
the high branch of the bus system being connected between the second resistor and the third resistor,
the low branch of the divided bus system being connected between the fourth resistor and the fifth resistor,
the low branch of the bus system being connected between the fifth resistor and the sixth resistor,
the first resistor and the fourth resistor being connected on ground potential, and
the third resistor and the sixth resistor being connected on supply voltage.

2. Circuit arrangement according to claim 1, characterized in that the resistive ladder is terminated to ground potential.

3. Circuit arrangement according to claim 2, characterized in that the resistive ladder is defined by at least one division factor constituted by a serial alignment of at least one resistor arrangement and at least one resistor.

4. Circuit arrangement according to claim 1, wherein the input stage further comprises a divided bus system connected downstream of the resistive ladder, characterized in that the amplifier stage comprises:
at least one pair of transistors assigned to the high branch of the divided bus system as well as
at least one pair of transistors assigned to the low branch of the divided bus system.

5. Circuit arrangement according to claim 4, characterized in
that the respective emitter terminal of the at least two transistors is connected to the high branch or to the low branch of the divided bus system via at least one respective reference resistor,
that the collector terminal of the first transistor is assigned to the high branch of the divided bus system,
that the collector terminal of the second transistor is assigned to the low branch of the divided bus system, that the collector terminal of the first transistor assigned to the high branch of the divided bus system is connected with the base terminal of the first transistor assigned to the high branch of the divided bus system, that the base terminal of the first transistor assigned to the high branch of the divided bus system is connected with the base terminal of the second transistor assigned to the high branch of the divided bus system, that the collector terminal of the second transistor assigned to the low branch of the divided bus system is connected with the base terminal of the second transistor assigned to the low branch of the divided bus system, and that the base terminal of the first transistor assigned to the low branch of the divided bus system is connected with the base terminal of the second transistor assigned to the low branch of the divided bus system.

6. System base chip, comprising at least one circuit arrangement according to claim 1 and covering C[ontroller]A[rea]N[etwork] applications and L[ocal]I[nterconnect]N[etwork] applications, ranging from local electric window nodes to central engine management and dashboard applications.

7. Circuit arrangement according to claim 1, wherein one resistor branch of the two parallel resistor branches comprises the first resistor, the second resistor, and the third resistor, and wherein another resistor branch of the two parallel resistor branches comprises the fourth resistor, the fifth resistor, and the sixth resistor.

8. Circuit arrangement for use in a data transmission system, the circuit arrangement comprising:

at least one input stage being connected downstream of at least one bus system, in particular of at least one C[ontroller]A[rea]N[etwork] bus system, the input stage comprising at least one resistive ladder for dividing the input signals, wherein the resistive ladder comprises two parallel resistor branches; and at least one amplifier stage connected downstream of the input stage, characterized in that the voltage range of the amplifier stage is limited to a defined maximum voltage, in particular to the supply voltage, wherein the input stage further comprises a divided bus system connected downstream of the resistive ladder, characterized in that the amplifier stage comprises:

at least one pair of transistors assigned to the high branch of the divided bus system as well as at least one pair of transistors assigned to the low branch of the divided bus system, characterized in that the respective emitter terminal of the at least two transistors is connected to the high branch or to the low branch of the divided bus system via at least one respective reference resistor, that the collector terminal of the first transistor is assigned to the high branch of the divided bus system, that the collector terminal of the second transistor is assigned to the low branch of the divided bus system, that the collector terminal of the first transistor assigned to the high branch of the divided bus system is connected with the base terminal of the first transistor assigned to the high branch of the divided bus system, that the base terminal of the first transistor assigned to the high branch of the divided bus system is connected with the base terminal of the second transistor assigned to the high branch of the divided bus system, that the collector terminal of the second transistor assigned to the low branch of the divided bus system is connected with the base terminal of the second transistor assigned to the low branch of the divided bus system, and that the base terminal of the first transistor assigned to the low branch of the divided bus system is connected with the base terminal of the second transistor assigned to the low branch of the divided bus system.

9. Circuit arrangement according to claim 8, characterized in that the resistive ladder is terminated to ground potential.

10. Circuit arrangement according to claim 9, characterized in that the resistive ladder is defined by at least one division factor constituted by a serial alignment of at least one resistor arrangement and at least one resistor.

11. Circuit arrangement according to claim 8, wherein the input stage further comprises a divided bus system connected downstream of the resistive ladder, characterized in that the resistive ladder comprises at least six resistors determining the recessive level of the high branch of the bus system as well as the low branch of the bus system, in particular with the high branch of the divided bus system being connected between the first resistor and the second resistor, the high branch of the bus system being connected between the second resistor and the third resistor, the low branch of the divided bus system being connected between the fourth resistor and the fifth resistor, the low branch of the bus system being connected between the fifth resistor and the sixth resistor, the first resistor and the fourth resistor being connected on ground potential, and the third resistor and the sixth resistor being connected on supply voltage.

12. System base chip, comprising at least one circuit arrangement according to claim 8 and covering C[ontroller]A[rea]N[etwork] applications and L[ocal]I[nterconnect]N[etwork] applications, ranging from local electric window nodes to central engine management and dashboard applications.

* * * * *